US012107374B2

(12) United States Patent
Nagase et al.

(10) Patent No.: US 12,107,374 B2
(45) Date of Patent: Oct. 1, 2024

(54) TERMINAL BLOCK

(71) Applicant: OMRON Corporation, Kyoto (JP)

(72) Inventors: Masao Nagase, Kyoto (JP); Taijiro Fujiwara, Kyoto (JP); Masato Matoba, Kyoto (JP); Hirokazu Hoshino, Kyoto (JP)

(73) Assignee: OMRON Corporation, Kyoto (JP)

( * ) Notice: Subject to any disclaimer, the term of this patent is extended or adjusted under 35 U.S.C. 154(b) by 344 days.

(21) Appl. No.: 17/769,334

(22) PCT Filed: Nov. 9, 2020

(86) PCT No.: PCT/JP2020/041682
§ 371 (c)(1),
(2) Date: Apr. 14, 2022

(87) PCT Pub. No.: WO2021/095676
PCT Pub. Date: May 20, 2021

(65) Prior Publication Data

US 2023/0282993 A1 Sep. 7, 2023

(30) Foreign Application Priority Data

Nov. 11, 2019 (JP) ................................ 2019-203970

(51) Int. Cl.
*H01R 4/48* (2006.01)
*H01R 13/639* (2006.01)

(52) U.S. Cl.
CPC ....... *H01R 4/48275* (2023.08); *H01R 13/639* (2013.01); *H01R 4/4809* (2013.01)

(58) Field of Classification Search
CPC H01R 4/48275; H01R 13/639; H01R 13/641; H01R 9/2475; H01R 4/4809; H01R 9/2416; H01R 13/629
See application file for complete search history.

(56) References Cited

U.S. PATENT DOCUMENTS

| | | | | |
|---|---|---|---|---|
| 8,292,677 B2 * | 10/2012 | Gassauer ........... | H01R 4/48365 439/729 |
| 8,388,387 B2 * | 3/2013 | Koellmann ........ | H01R 4/48365 439/729 |
| 10,103,460 B2 * | 10/2018 | Ono ..................... | H01R 9/2683 |

FOREIGN PATENT DOCUMENTS

| | | |
|---|---|---|
| EP | 2768079 | 8/2014 |
| JP | H04155784 | 5/1992 |

(Continued)

OTHER PUBLICATIONS

"International Search Report (Form PCT/ISA/210) of PCT/JP2020/041682," mailed on Dec. 8, 2020, with English translation thereof, pp. 1-4.

(Continued)

*Primary Examiner* — Briggitte R. Hammond
(74) *Attorney, Agent, or Firm* — JCIPRNET

(57) ABSTRACT

The present invention facilitates making electrical connections. In this terminal block, when an electric wire is inserted in a housing, the end of the electric wire pushes in a block part of a movable member, and a contact part of a locking member with the block part interposed therebetween, thereby releasing the locking of a leaf spring moving part by a hook part of the locking member, and the electric wire is secured by the leaf spring moving part, and the degree to which a display part of the movable member moving in conjunction with the block part is visible through a window part changes according to the change in position of the display part.

10 Claims, 7 Drawing Sheets

(56) References Cited

FOREIGN PATENT DOCUMENTS

| | | |
|---|---|---|
| JP | H06168746 | 6/1994 |
| JP | H1050366 | 2/1998 |
| JP | 2006012634 | 1/2006 |
| JP | 2009230859 | 10/2009 |
| JP | 5043727 | 10/2012 |
| WO | 2019176661 | 9/2019 |

OTHER PUBLICATIONS

"Written Opinion of the International Searching Authority (Form PCT/ISA/237) of PCT/JP2020/041682," mailed on Dec. 8, 2020, with English translation thereof, pp. 1-7.

* cited by examiner

TERMINAL BLOCK

CROSS-REFERENCE TO RELATED APPLICATION

This application is a 371 application of the International PCT application serial no. PCT/JP2020/041682, filed on Nov. 9, 2020, which claims the priority benefits of Japan Patent Application No. 2019-203970, filed on Nov. 11, 2019. The entirety of each of the above-mentioned patent applications is hereby incorporated by reference herein and made a part of this specification.

TECHNICAL FIELD

The disclosure relates to a terminal block for connecting an electric wire.

RELATED ART

A push-in connection type terminal block that simplifies the connection of electric wires is known, which has a mechanism that when the electric wire with its coating removed is inserted from an insertion port provided in a housing, the electric wire is fixed in contact with the metal parts provided inside.

Further, Patent Literature 1 discloses a terminal block that allows a user to easily recognize from the outside that an electric wire is connected by a display through a window part. The terminal block of Patent Literature 1 is configured so that when an electric wire is inserted, it is pushed by the end of the electric wire to move the movable member, and the display part provided as a part of the movable member moves to a position visible from the window part.

Patent Literature 2 discloses a terminal block having a mechanism for locking a movable part of a leaf spring for fixing an electric wire. In the terminal block of Patent Literature 2, it is configured that when a part of the mechanism inside the housing is pushed by the tip of a tool or the like, the leaf spring is locked with the electric wire released, and the electric wire can be easily removed.

CITATION LIST

Patent Literature

[Patent Literature 1] Japanese Patent No. 5043727
[Patent Literature 2] European Patent No. EP 2768079

SUMMARY

Technical Problem

Generally, in a push-in connection type terminal block, it is necessary to insert the electric wire while pushing the movable part of the leaf spring for fixing the electric wire against the urging force, and there is a problem that the electric wire cannot be inserted smoothly. This problem also applies to the terminal block of the conventional technology described in Patent Literature 1.

In addition, the conventional terminal block described in Patent Literature 2 is provided with a mechanism for locking the movable part of the leaf spring, so the problem is solved. However, when the electric wire is connected, the lock is suddenly released and the electric wire is fixed in a state without the feeling of pushing, so there is a problem that it is difficult to grasp the feeling and sense of the inserted state of the electric wire leading to the fixing.

An embodiment of the disclosure realizes a push-in connection type terminal block in which the feeling of the inserted state of the electric wire leading to the fixing can be easily grasped and the electric wire can be easily inserted.

Solution to Problem

The disclosure adopts the following configuration in order to solve the above-mentioned issues.

A terminal block according to an aspect of the disclosure includes a housing provided with an accommodating part; and a movable member, a leaf spring, and a locking member disposed in the accommodating part. The housing is provided with a window part and an insertion part for inserting an electric wire. The leaf spring is provided with a fixed part and a plate-shaped movable part that is movable with respect to the housing. The locking member is provided with a claw part for locking the movable part and a contact part moving in conjunction with the claw part. The movable member is provided with a display part, a block part moving in conjunction with the display part, and an urging part, wherein the urging part applies an urging force to the block part in a direction substantially opposite to an insertion direction of the electric wire. When the electric wire is inserted into the housing through the insertion part, an end of the electric wire pushes the block part, and the contact part is further pushed via the block part, whereby locking by the claw part is released, and an end of the movable part is pressed against a side surface of the electric wire, and the electric wire is fixed. A visible state of the display part through the window part changes due to a change in a position of the display part moving in conjunction with the block part.

Effects of Invention

According to an embodiment of the disclosure, a push-in connection type terminal block may be realized in which the feeling of the inserted state of the electric wire leading to the fixing can be easily grasped and the electric wire can be easily inserted.

DESCRIPTION OF THE EMBODIMENTS

Embodiment

Hereinafter, an embodiment according to one aspect of the disclosure (hereinafter also referred to as "this embodiment") will be described.

§ 1 Application Example

First, an example of a scenario in which the disclosure is applied will be described. The application example of this embodiment may be applied to a push-in connection type terminal block.

The terminal block according to the application example of this embodiment includes a housing provided with an accommodating part, a movable member, a leaf spring, and a locking member disposed in the accommodating part. The housing is provided with a window part and an insertion part for inserting an electric wire.

The leaf spring is provided with a fixed part (leaf spring fixed part) directly or indirectly fixed to the housing and a plate-shaped movable part (leaf spring movable part) that is movable with respect to the housing. The locking member is provided with a claw part for locking the movable part and a contact part moving in conjunction with the claw part. The movable member is provided with a display part, a block part moving in conjunction with the display part, and an urging part, and the urging part applies an urging force to the block part in a direction substantially opposite to the insertion direction of the electric wire.

In the terminal block according to the application example of this embodiment, when the electric wire is inserted into the housing through the insertion part, the end of the electric wire pushes the block part. Then, the contact part is further pushed via the block part, whereby the locking by the claw part is released, and the end of the movable part (leaf spring movable part) is pressed against the side surface of the electric wire, and the electric wire is fixed.

Further, the visible state of the display part through the window part changes due to the change in the position of the display part moving in conjunction with the block part.

By providing the terminal block according to the application example of this embodiment, it is easy to get a sense of the inserted state of the electric wire leading to the fixing, and it is easy to insert the electric wire. In addition, whether or not the electric wire is in the fixed state can be easily visually recognized from the outside by the display of the window part.

§ 2 Configuration Example

Figure 1:
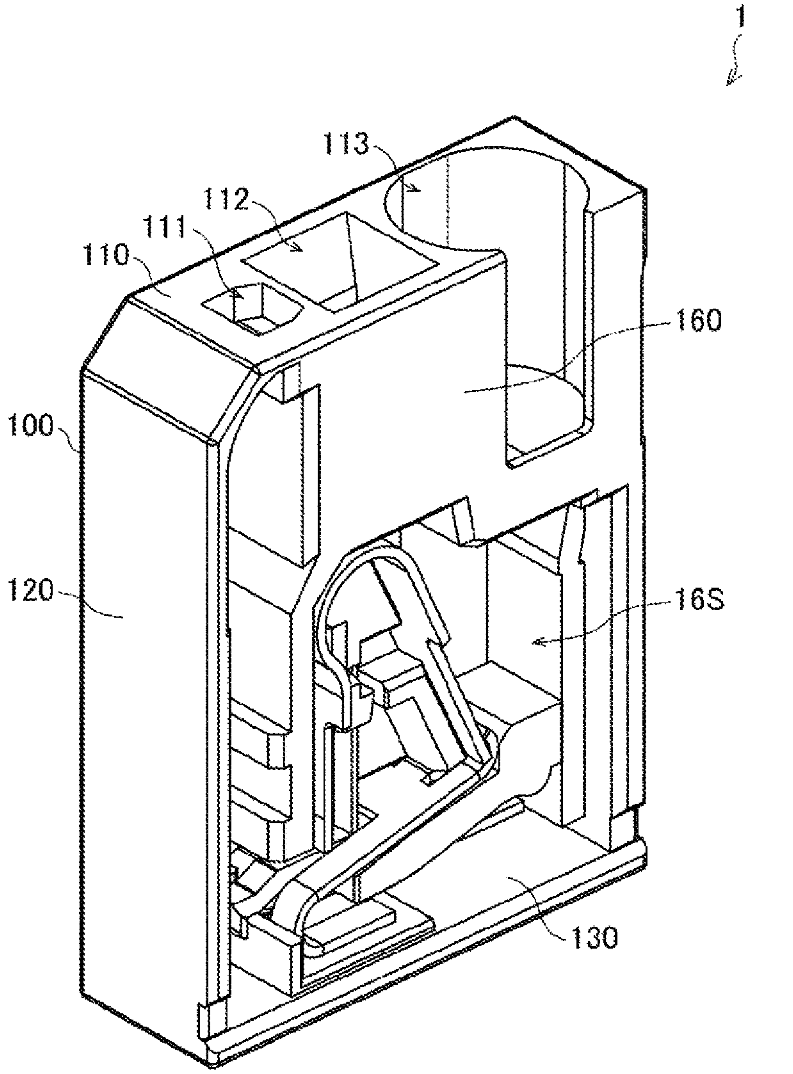
FIG. 1 is a perspective view showing a configuration of a terminal block according to an embodiment of the disclosure.
Figure 2:
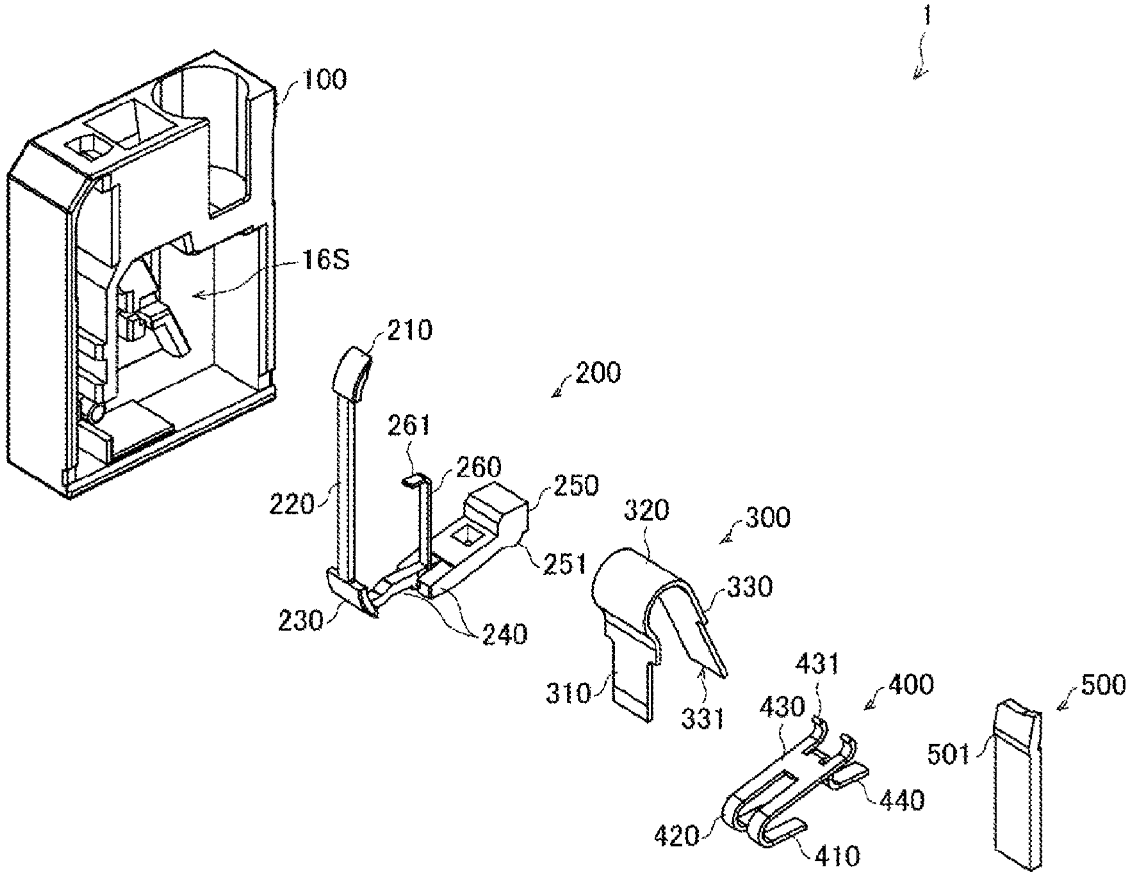
FIG. 2 is an exploded perspective view showing a configuration of a terminal block according to an embodiment of the disclosure.
Figure 3:
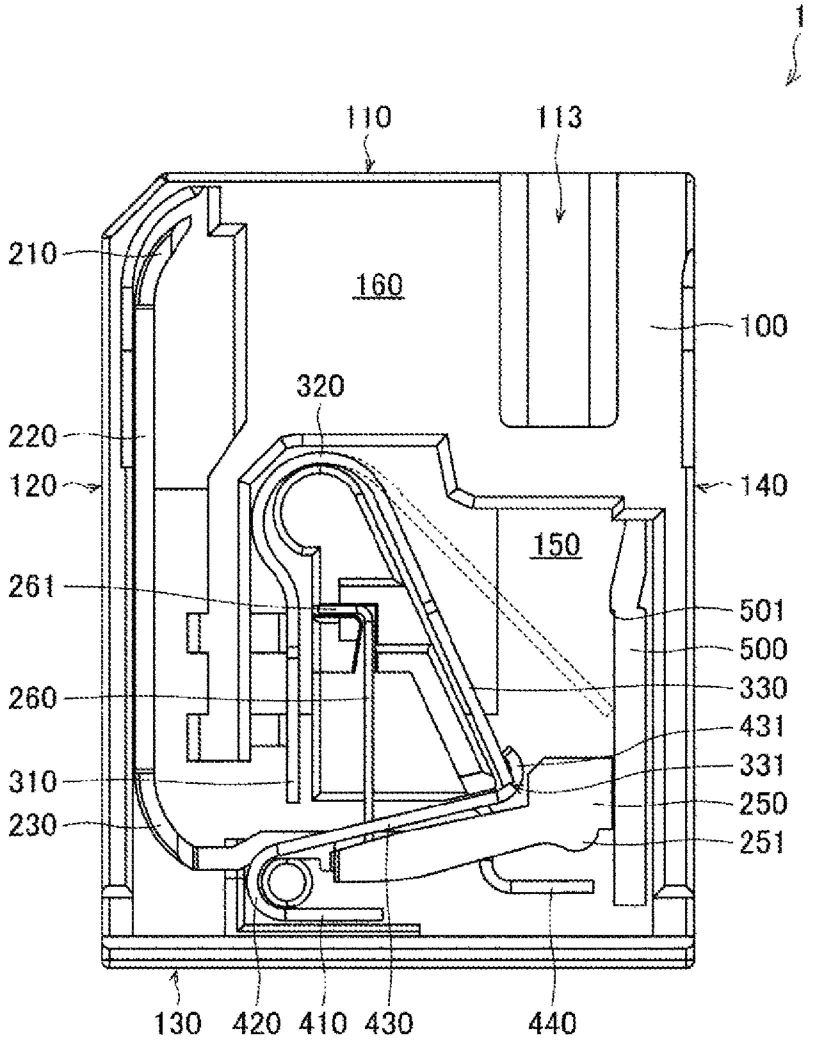
FIG. 3 is a front view showing a terminal block according to an embodiment of the disclosure.

A more specific configuration example of the terminal block in this embodiment will be described with reference to FIGS. 1 to 7. FIGS. 1 to 3 are views showing the terminal block 1 according to the configuration example of this embodiment, and first, the configuration of the terminal block 1 will be described with reference to FIGS. 1 to 3.

FIG. 1 is a perspective view showing the configuration of the terminal block 1. FIG. 2 is an exploded perspective view showing the configuration of the terminal block 1. FIG. 3 is a front view showing the configuration of the terminal block 1. FIGS. 1 and 3 show the terminal block 1 with a leaf spring movable part 330 of a leaf spring 300 in a locked state. Further, in FIG. 3, the approximate position of the leaf spring movable part 330 in an unlocked state is also shown by a dotted line.

The terminal block 1 includes a housing 100; and a movable member 200, a leaf spring 300, a locking member 400, and a vertical plate 500 disposed in an accommodating part 13S which is a hollow part inside the housing 100. The housing 100 is made of an insulating material such as resin. As shown in FIG. 1, the overall outer shape of the housing 100 is a substantially rectangular parallelepiped.

The upper side surface, the left side surface, the lower side surface, and the right side surface of the housing 100 are a first side surface 110, a second side surface 120, a third side surface 130, and a fourth side surface 140, respectively. The side surface on the back side and the side surface on the front side of the housing 100 a fifth side surface 150 and a sixth side surface 160, respectively.

In the specification, the terms "upper," "lower," "right," "left," "front side," "back side" and the like used with reference to the drawings are used to facilitate understanding of the disclosure. The use of these terms does not substantially limit the method of installing the terminal block 1. The terminal block 1 according to this embodiment may be installed and used in any direction with respect to a horizontal plane or a vertical surface.

The first side surface 110, the second side surface 120, the third side surface 130, and the fourth side surface 140 of the housing 100 are each elongated and substantially rectangular, and the housing 100 is a thin rectangular parallelepiped with a thin thickness from the front side to the back side as a whole.

No openings are provided in the second side surface 120, the third side surface 130, the fourth side surface 140, and the fifth side surface 150 of the housing 100. A large opening is provided on the fifth side surface 150 side, which is the side surface on the front side, and configures the accommodating part 13S.

The movable member 200, the leaf spring 300, the locking member 400, and the vertical plate 500 are assembled in the accommodating part 13S through the opening. The movable member 200, the leaf spring 300, the locking member 400, and the vertical plate 500 are appropriately provided by a defining wall having a predetermined thickness protruding from the fifth side surface 150, which is the side surface on the back side of the housing 100, toward the front side. A lid part that covers the sixth side surface 160, which is the side surface on the front side of the housing 100, may be further provided to close the accommodating part 13S.

On the first side surface 110 of the housing 100, a window part 111, a tool opening 112, and an insertion part 113, each of which is an opening leading to the accommodating part 13S, are disposed in this order side by side in a line. The window part 111 is provided near the second side surface 120. The tool opening 112 is provided in the area between the window part 111 and the insertion part 113.

The insertion part 113 is an opening for inserting an electric wire 90 from the outside of the terminal block 1. The insertion part 113 is provided near the fourth side surface 140, and the electric wire 90 is inserted and removed at a position close to the fourth side surface 140. The insertion direction of the electric wire 90 is downward, and the removal direction of the electric wire 90 is upward. A wall surface is provided around the inside of the insertion part 113 of the housing 100 to guide the direction of inserting and removing the electric wire 90.

The leaf spring 300 is an open U-shaped member configured by a single metal plate for fixing the electric wire 90 at the time of connection. The leaf spring 300 is provided with a leaf spring fixed part 310, a leaf spring bent part 320, and a leaf spring movable part 330. The leaf spring bent part 320 is a part where the metal plate is bent between the flat plate-shaped leaf spring fixed part 310 and the flat plate-shaped leaf spring movable part 330. The end of the leaf spring 300 on the leaf spring movable part 330 side is a leaf spring movable part end 331.

The leaf spring 300 is disposed in the accommodating part 13S so that the leaf spring bent part 320 faces upward. The leaf spring fixed part 310 is fixed to the housing 100 by the defining wall from the fifth side surface 150. The elasticity of the metal plate may change the opening angle between the leaf spring fixed part 310 and the leaf spring movable part 330, so that the leaf spring movable part 330 is movable with respect to the housing 100.

The flat plate-shaped leaf spring movable part 330 is disposed diagonally with respect to the insertion direction of the electric wire 90. As shown by the dotted line in FIG. 3, when the leaf spring movable part 330 is not locked by the locking member 400, a wire end 91 is in a position where it collides with the leaf spring movable part 330 when the electric wire 90 is inserted from the insertion part 113. The leaf spring bent part 320 disposed above is in a position where it does not come into contact with the electric wire 90.

The vertical plate 500 is a vertically elongated metal plate disposed along the fourth side surface 140 from the vicinity of the center in the vertical direction to the vicinity of the lower end of the fourth side surface 140. When the electric wire 90 is connected to the terminal block 1, the electric wire 90 is fixed to be sandwiched between the leaf spring movable part end 331 and the vertical plate 500. The vertical plate 500 is provided with a small protrusion 501 to prevent slipping when the electric wire 90 is fixed.

The leaf spring 300 and the vertical plate 500 are members that are electrically connected to the electric wire when the electric wire 90 is fixed. Wiring members such as lead wires (not shown) electrically connected to at least one of them realizes electrical extraction from the terminal block 1.

The locking member 400 is a leaf spring member configured by a single metal plate for locking the leaf spring movable part 330. The locking member 400 is disposed in the accommodating part 13S at a position close to the third side surface 130 below the leaf spring 300. The locking member 400 is provided with a locking member fixed part 410, a locking member bent part 420, a locking member movable part 430, and a contact part 440.

The locking member fixed part 410 is a part disposed in the vicinity of the third side surface 130 and fixed to the housing 100. The locking member bent part 420 is a part where the metal plate is bent between the locking member fixed part 410 and the locking member movable part 430. The locking member movable part 430 is a part movable with respect to the housing 100. The locking member fixed part 410, the locking member bent part 420, and the locking member movable part 430 have a substantially J-shaped shape as a whole. The locking member fixed part 410 is shorter than the locking member movable part 430.

The locking member movable part 430 has a claw part 431 at an end opposite to the locking member bent part 420. As shown in FIGS. 1 and 3, the claw part 431 may hook on the leaf spring movable part end 331 to lock the leaf spring movable part 330.

When the locking member fixed part 410 is pushed downward against the urging force of the locking member 400 as the leaf spring member, the claw part 431 is disengaged from the leaf spring movable part end 331, and the locking of the leaf spring movable part 330 is released. The contact part 440 moving in conjunction with the locking member movable part 430 is connected to the locking member movable part 430. The contact part 440 is provided to extend downward from the locking member movable part 430 and in a direction away from the locking member bent part 420.

The movable member 200 is provided with a display part 210, a vertical bar part 220, a connection part 230, a horizontal bar part 240, a block part 250, and an urging part 260. The display part 210 is connected to the connection part 230 by the vertical bar part. The connection part 230 is connected to the block part 250 by the horizontal bar part 240. The display part 210 moves in conjunction with the block part 250.

In the accommodating part 13S, the vertical bar part 220 is disposed along the second side surface 120 in a substantially vertical direction (substantially parallel to the insertion direction of the electric wire 90). The horizontal bar part 240 is disposed near the third side surface 130 in a substantially left-right direction (substantially perpendicular to the insertion direction of the electric wire 90). The part of the movable member 200 from the display part 210 to the block part 250 has a substantially L-shaped shape as a whole bent by the connection part 230.

An urging part 260 made of an elastic member such as metal and extending upward is provided near the center of the horizontal bar part 240. The upper end of the urging part 260 is bent to form the movable member fixed part 261. The movable member fixed part 261 is a part of the movable member 200 that is fixed to the housing 100.

The block part 250 is a block-shaped part provided at the right end part of the movable member 200. The block part 250 is disposed close to the vertical plate 500, and when the electric wire 90 is inserted, the upper surface thereof is in a position where it comes into contact with the electric wire end 91. The block part 250 has a protrusion 251 below the block part 250.

Figure 4:
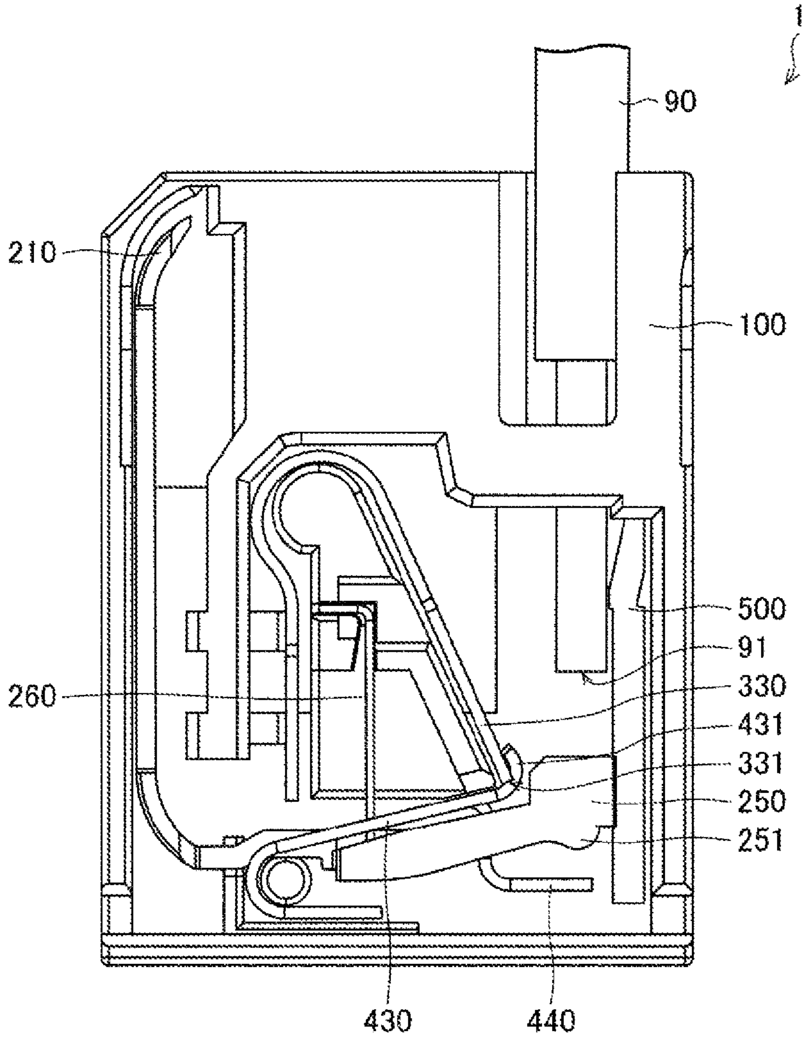
FIG. 4 is a front view showing a terminal block according to an embodiment of the disclosure and shows a state in which the electric wire is being inserted.
Figure 5:
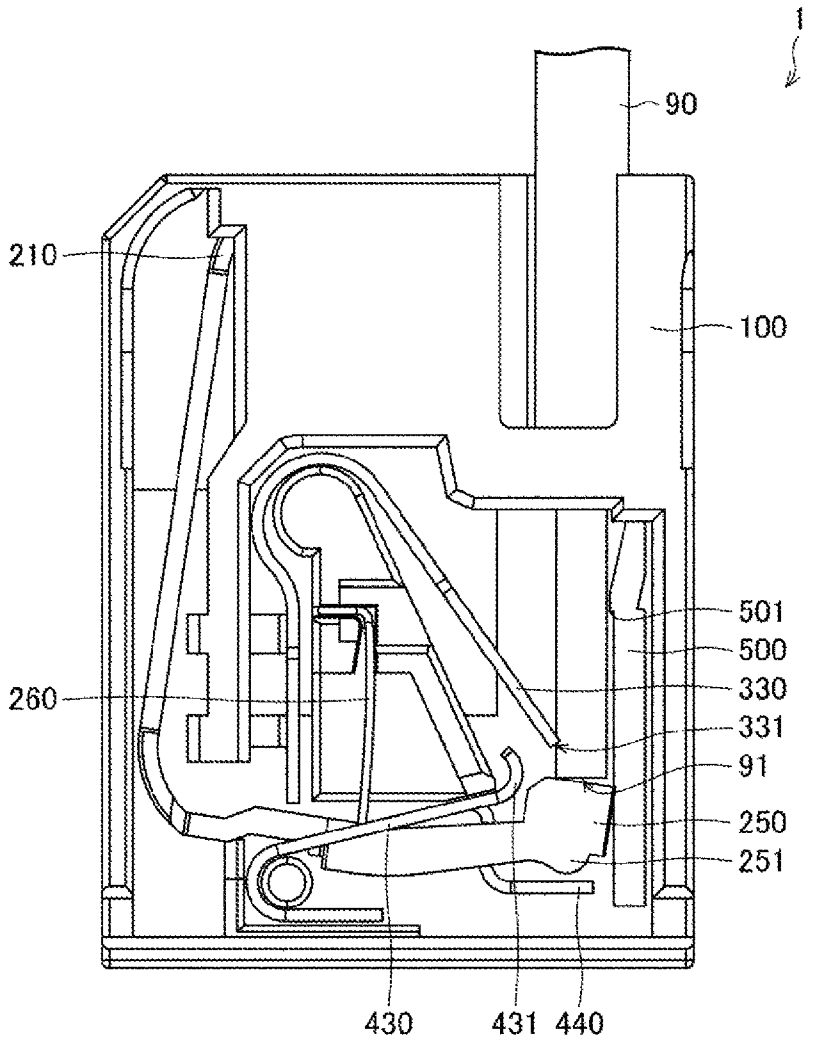
FIG. 5 is a front view showing a terminal block according to an embodiment of the disclosure and shows a state in which the electric wire is fixed.
Figure 6:
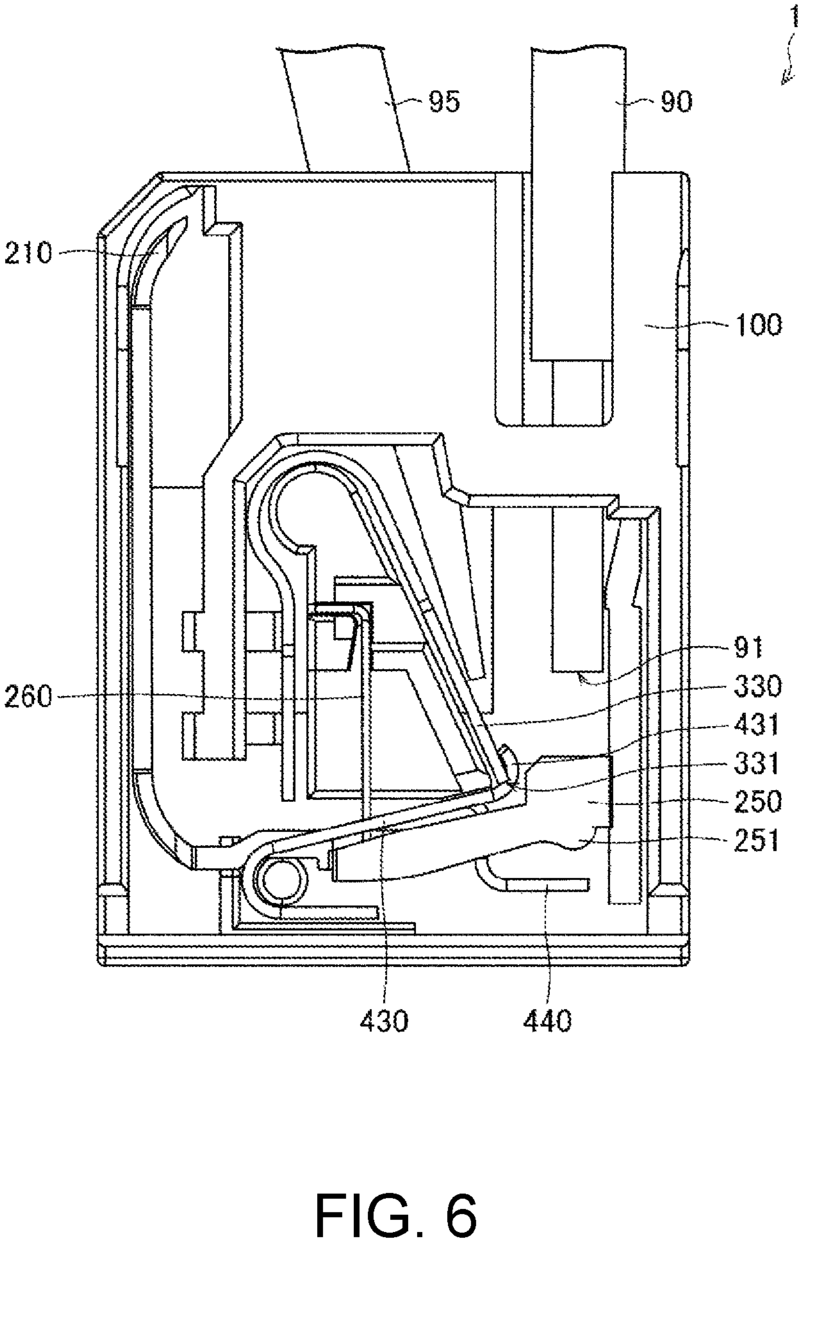
FIG. 6 is a front view showing a terminal block according to an embodiment of the disclosure and shows a state in which the electric wire is released from being fixed.

Next, with reference to FIGS. 4 to 7, a method of connecting or removing the electric wire 90 to and from the terminal block 1 will be described, and the configuration of the terminal block 1 will be further described. FIGS. 4 to 6 are front views showing the terminal block 1.

FIG. 4 shows a situation in which the leaf spring movable part 330 is locked by the locking member 400 (similar to FIGS. 1 and 3) as the initial state of the terminal block 1, and shows the state in which the electric wire 90 is inserted halfway from the insertion part 113. When the electric wire 90 from which the coating near the end is removed is inserted from the insertion part 113, the electric wire 90 is guided downward along the wall surface of the insertion part 113. When the leaf spring movable part 330 is locked by the locking member 400, the electric wire 90 does not come into contact with the leaf spring movable part 330.

When the electric wire 90 is inserted into the depth from the state of FIG. 4, the electric wire end 91 comes into contact with the upper surface of the block part 250 of the movable member 200. Further, in order to insert the electric wire 90 from this state, it is necessary to push down the block part 250 against the urging force provided by the urging part 260 of the movable member 200.

When the electric wire 90 is inserted into the interior while pushing down the block part 250, the protrusion 251 of the block part 250 pushes down the contact part 440 of the locking member 400. Then, the claw part 431 of the locking member 400 is pushed down in conjunction with the contact part 440, and the locking of the leaf spring movable part 330 is released.

FIG. 5 is a view showing a state in which the locking of the leaf spring movable part 330 is released by insertion of the electric wire 90. When the locking of the leaf spring movable part 330 is released, the leaf spring movable part 330 rotates and moves (counterclockwise as viewed from the front side) so that the opening angle between the leaf spring fixed part 310 and the leaf spring movable part 330 is increased. Then, the leaf spring movable part 330 hits the electric wire 90 diagonally so that the leaf spring movable part end 331 comes into contact with the side surface of the electric wire 90.

At this time, the leaf spring movable part 330 is urged in a direction in which the opening angle between the leaf spring fixed part 310 and the leaf spring movable part 330 is further increased, and the leaf spring movable part end 331 strongly pushes the side surface of the electric wire 90. The electric wire 90 is sandwiched and fixed between the vertical plate 500 and the leaf spring movable part end 331.

Since the vertical plate 500 is provided with the small protrusion 501 at a position in contact with the side surface of the electric wire 90, the electric wire 90 is less likely to slip. Further, even if an attempt is made to pull out the fixed electric wire 90, the leaf spring movable part 330 is locked diagonally to the electric wire 90 and cannot be pulled out. In this way, the electric wire 90 is securely fixed between the vertical plate 500 and the leaf spring movable part 330.

As shown in FIG. 5, the display part 210 moves in the direction of the electric wire 90 (substantially to the right) in conjunction with the movement of the position of the pushed down block part 250. That is, the entire movable member 200 having a substantially L-shape except for the urging part 260 rotates clockwise when viewed from the front side in a state of being suspended from the urging part 260.

With the display part 210 moving, the visible state of the display part 210 through the window part 111 changes. In this embodiment, the display part 210 is not visible through the window part 111 in the initial state shown in FIG. 3. In a state in which the electric wire 90 is fixed as shown in FIG. 5, the display part 210 is configured to be visible from the outside through the window part 111. Note that this relationship may be reversed.

Figure 7:
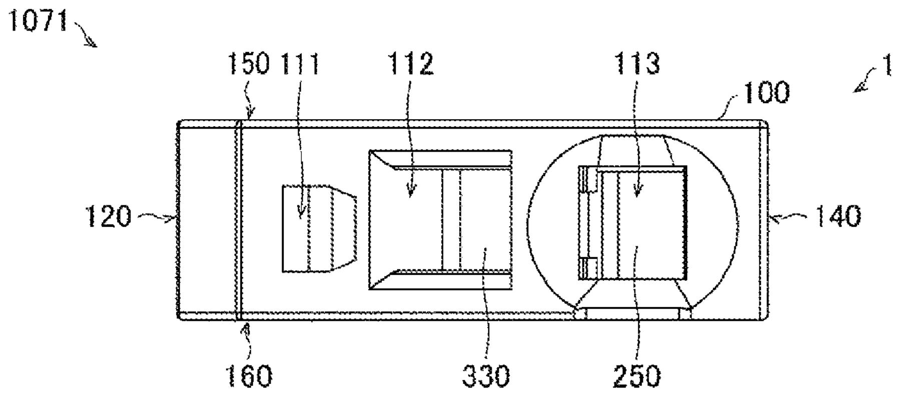
FIG. 7 is a plan view showing a terminal block according to an embodiment of the disclosure and shows a comparison between a state in which the electric wire is fixed and a state in which the electric wire is not fixed.
Figure 7:
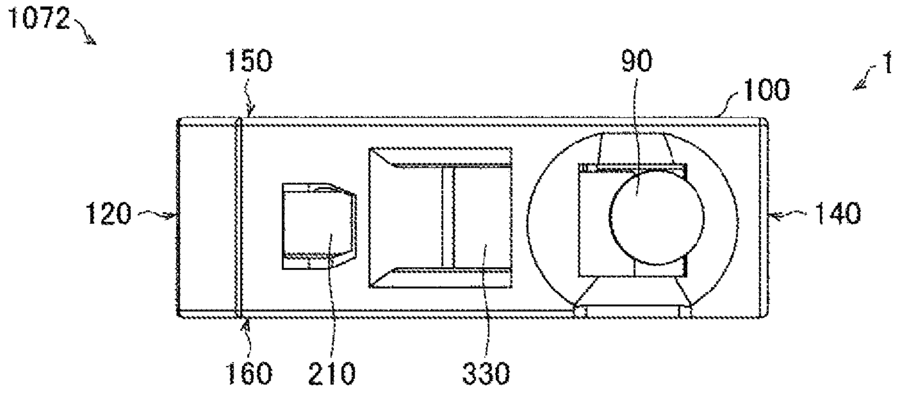

FIG. 7 is a view comparing and showing the visible state of the display part 210 through the window part 111. In FIG. 7, a plan view 1071 shows an initial state in which the display part 210 is not visible through the window part 111 (a plan view corresponding to the front view of FIG. 3). Further, a plan view 1072 shows a state in which the display part 210 is not visible through the window part 111 (a plan view corresponding to the front view of FIG. 5). It is preferable that the part visible through the window part 111 of the display part 210 in a state in which the electric wire 90 is fixed is colored in a clear color.

FIG. 6 is a view for illustrating the work of removing the electric wire 90. An operator inserts a rod-shaped tool 95 such as a flat-blade screwdriver through the tool opening 112. As the tool 95 is inserted, it is guided by the wall surface of the tool opening 112 and diagonally hits the leaf spring movable part 330.

When the operator pushes the tool 95 further against the urging force of the leaf spring 300, the leaf spring movable part 330 rotates and moves (clockwise as viewed from the front side) so that the opening angle between the leaf spring fixed part 310 and the leaf spring movable part 330 is decreased. Then, the leaf spring movable part end 331 is hooked on the claw part 431 of the locking member 400, and the leaf spring movable part 330 is locked.

The fixing of the electric wire 90 by the leaf spring movable part 330 is kept in a released state. The operator may easily pull out the electric wire 90. When the electric wire 90 is pulled out, the movable member 200 is urged by the urging part 260, and the block part 250 moves upward, and the display part 210 moves to a position invisible through the window part 111. The position of the movable member 200 returns to the state shown in FIG. 3 (similar to FIGS. 1 and 4). In this way, the state of the terminal block 1 returns to the initial state shown in FIG. 3.

According to the application example of this embodiment, the operator does not need to simultaneously insert the tool 95 and pull out the electric wire 90 when removing the electric wire 90. This is because the terminal block 1 maintains the state in which the electric wire 90 is released from being fixed.

The operator inserts the tool 95 into the interior through the tool opening 112, and when the feeling of pushing the leaf spring movable part 330 is obtained, the tool 95 may be pulled out, and then the electric wire 90 may be pulled out. At this time, since the leaf spring movable part 330 is released from being fixed, the electric wire 90 may be easily pulled out. Therefore, according to the terminal block 1 according to the application example of this embodiment, the operator may easily perform the work of removing the electric wire 90.

In the conventional technology such as Patent Literature 1, it is necessary to push the leaf spring movable part with the end of the electric wire at the time of inserting the electric wire during the connection work of the electric wire. The leaf spring of the terminal block has a strong urging force in order to firmly fix the electric wire. Therefore, in the conventional technology, it is necessary to push the electric wire with a considerable force against the leaf spring, and the connection work is not easy.

In particular, when the electric wire is a stranded wire obtained by twisting thin wires, if the thin wires are not tightly organized, they may be unwound when pushed in and the connection work may fail. However, according to the application example of this embodiment, it is not necessary to push the leaf spring movable part 330 with the electric wire end 91 when the electric wire 90 is inserted. Therefore, in the terminal block 1, the connection work of the electric wire 90 may be easily and reliably performed.

In the conventional technology of Patent Literature 2, since the electric wire connection state cannot be confirmed after the electric wire is connected, there is a problem that even if the electric wire is pulled and the electric wire is about to be removed during use or wiring, the state cannot be confirmed. However, in the terminal block 1, when the electric wire 90 is connected, the operator may easily confirm by visually observing the window part 111 that the electric wire 90 is fixed. Therefore, according to the application example of this embodiment, it is possible to realize a terminal block capable of displaying the fixing of the electric wire, facilitating insertion of the electric wire, and facilitating the connection work.

In the conventional technology of Patent Literature 2, when the electric wire is connected, the repulsive force due to the insertion of the electric wire cannot be obtained, so it is difficult for the operator to grasp the inserted state of the electric wire, and there is a problem that the lock is suddenly released and the wire is fixed by the leaf spring.

However, according to the application example of this embodiment, when the electric wire 90 is inserted, it is necessary for the operator to push down the block part 250 with the electric wire end 91 against the urging force applied by the urging part 260 of the movable member 200 before the locking of the leaf spring movable part 330 is released and the electric wire 90 is fixed. Therefore, the operator may obtain a feeling of repulsive force before the electric wire 90 is fixed, may grasp the state of insertion of the electric wire, and may easily grasp the feeling and sense of the connection work.

The urging force of the movable member 200 is not as strong as the urging force of the leaf spring for fixing the electric wire, but an appropriate urging force is given. Therefore, in the terminal block 1, the connection work of the electric wire 90 may be easily and reliably performed.

Summary

A terminal block according to an aspect of the disclosure includes a housing provided with an accommodating part; and a movable member, a leaf spring, and a locking member disposed in the accommodating part. The housing is provided with a window part and an insertion part for inserting an electric wire. The leaf spring is provided with a fixed part and a plate-shaped movable part that is movable with respect to the housing. The locking member is provided with a claw part for locking the movable part and a contact part moving in conjunction with the claw part. The movable member is provided with a display part, a block part moving in conjunction with the display part, and an urging part, wherein the urging part applies an urging force to the block part in a direction substantially opposite to an insertion direction of the electric wire. When the electric wire is inserted into the housing through the insertion part, an end of the electric wire pushes the block part, and the contact part is further pushed via the block part, whereby locking by the claw part is released, and an end of the movable part is pressed against a side surface of the electric wire, and the electric wire is fixed. A visible state of the display part through the window part changes due to a change in a position of the display part moving in conjunction with the block part.

According to the above configuration, a push-in connection type terminal block may be realized in which the feeling of the inserted state of the electric wire leading to the fixing can be easily grasped and the electric wire can be easily inserted. Alternatively, a push-in connection type terminal block may be realized in which whether or not the electric wire is in the fixed state may be easily visually recognized from the outside by display of the window part.

In the terminal block according to the above aspect, it may include a configuration in which the housing is further provided with a tool opening on the first side surface, and when a rod-shaped tool is inserted through the tool opening, an end of the tool diagonally hits the movable part and moves the movable part against the urging force of the leaf spring, whereby fixing of the electric wire by the movable part is released, and the movable part is further locked by the claw part.

According to the above configuration, a push-in connection type terminal block may be realized which facilitates the work of removing the electric wire.

In the terminal block according to the above aspect, it may include a configuration in which when the electric wire whose fixing is released is pulled out, the urging force of the urging part causes the block part to move in a direction opposite to the insertion direction, and the visible state of the display part through the window part changes due to the change in the position of the display part moving in conjunction with the block part.

According to the above configuration, a push-in connection type terminal block may be realized in which the connection state of the electric wire may be visually recognized from the outside and easily confirmed.

In the terminal block according to the above aspect, the window part, the tool opening, and the insertion part may be disposed in this order side by side in a line on the first side surface of the housing. According to the above configuration, it is possible to realize a push-in connection type terminal block in which an operator may more easily visually recognize and confirm the connection state of the electric wire from the outside during the connection or removal work of the electric wire.

In the terminal block according to the above aspect, it may include a configuration in which the movable part is disposed diagonally with respect to the insertion direction. According to the above configuration, a push-in connection type terminal block may be realized in which the electric wire is locked against the pulling force when the electric wire is connected and is difficult to be pulled out.

The disclosure is not limited to the above-described embodiments, and various modifications may be made within the scope of the claims. The embodiments obtained by appropriately combining the technical means disclosed in different embodiments are also included in the technical scope of the disclosure.

What is claimed is:

1. A terminal block comprising:

a housing provided with an accommodating part; and a movable member, a leaf spring, and a locking member disposed in the accommodating part, wherein the housing is provided with a window part and an insertion part for inserting an electric wire, wherein the leaf spring is provided with a fixed part and a plate-shaped movable part that is movable with respect to the housing, wherein the locking member is provided with a claw part for locking the movable part and a contact part moving in conjunction with the claw part, wherein the movable member is provided with a display part, a block part moving in conjunction with the display part, and an urging part, wherein the urging part applies an urging force to the block part in a direction opposite to an insertion direction of the electric wire, and wherein when the electric wire is inserted into the housing through the insertion part, an end of the electric wire pushes the block part, and the contact part is further pushed via the block part, whereby locking by the claw part is released, and an end of the movable part is pressed against a side surface of the electric wire, and the electric wire is fixed, and a visible state of the display part through the window part changes due to a change in a position of the display part moving in conjunction with the block part.

2. The terminal block according to claim 1, wherein the housing is further provided with a tool opening, and when a rod-shaped tool is inserted through the tool opening, an end of the tool diagonally hits the movable part and moves the movable part against an urging force of the leaf spring, whereby fixing of the electric wire by the movable part is released, and the movable part is further locked by the claw part.

3. The terminal block according to claim 2, wherein when the electric wire whose fixing is released is pulled out, the urging force of the urging part causes the block part to move in a direction opposite to the insertion direction, and the visible state of the display part through the window part changes due to the change in the position of the display part moving in conjunction with the block part.

4. The terminal block according to claim 2, wherein the window part, the tool opening, and the insertion part are disposed in this order side by side in a line on a first side surface of the housing.

5. The terminal block according to claim 1, wherein the movable part is disposed diagonally with respect to the insertion direction.

6. The terminal block according to claim 3, wherein the window part, the tool opening, and the insertion part are disposed in this order side by side in a line on a first side surface of the housing.

7. The terminal block according to claim 2, wherein the movable part is disposed diagonally with respect to the insertion direction.

8. The terminal block according to claim 3, wherein the movable part is disposed diagonally with respect to the insertion direction.

9. The terminal block according to claim 4, wherein the movable part is disposed diagonally with respect to the insertion direction.

10. The terminal block according to claim 6, wherein the movable part is disposed diagonally with respect to the insertion direction.

* * * * *